United States Patent [19]

Emile, Jr.

[11] 4,125,993

[45] Nov. 21, 1978

[54] DIGITAL DISPLAY DEVICES WITH REMOTE UPDATING

[76] Inventor: Philip Emile, Jr., 14 Eisenhower Pkwy., Roseland, N.Y. 07068

[21] Appl. No.: 702,034

[22] Filed: Jul. 2, 1976

[51] Int. Cl.[2] ........................ G04C 3/00; G04C 13/04; H04M 15/38

[52] U.S. Cl. ........................................ 58/23 R; 58/25; 58/145 K; 58/152 T; 179/2 TC; 340/324 M

[58] Field of Search .......... 179/2 TC; 58/23 R, 50 R, 58/24, 26, 145 K, 152 T, 25, 26 R, 24 R; 340/324 R, 334, 324 M

[56] References Cited

U.S. PATENT DOCUMENTS

| | | | |
|---|---|---|---|
| 3,681,914 | 8/1972 | Loewengart | 58/24 |
| 3,811,265 | 5/1974 | Cater | 58/24 R |
| 3,813,533 | 5/1974 | Cone et al. | 58/50 R |
| 3,861,134 | 1/1975 | Chacon et al. | 58/24 R |
| 3,943,288 | 3/1976 | Reed et al. | 58/152 T |

*Primary Examiner*—Edith S. Jackmon
*Attorney, Agent, or Firm*—Sidney S. Kanter

[57] ABSTRACT

Digital display devices and digital timepieces in which the display is remotely updated. The method permits continuous updating with simple and inexpensive TTL Logic and less frequent updating with microprocessor means. The remote updating signal can be transmitted through telephone means, broadcast means or other standard communications means to simultaneously update multiple digital displays.

A single improved digital display device can be utilized as a master for controlling the display of multiple devices.

8 Claims, 7 Drawing Figures

DIGITAL DISPLAY TIMEPIECE WITH REMOTE UPDATING

CONVENTIONAL DIGITAL TIMEPIECE

DIGITAL DISPLAY TIMEPIECE WITH REMOTE UPDATING

POSITION

CHARACTER

| | | | 7 | 6 | 5 | 4 | 3 | 2 | 1 | 0 |
|---|---|---|---|---|---|---|---|---|---|---|
| 9 | 1001 | | y | i | Y | I | 9 | ) | CONTROL Y | CONTROL I |
| 8 | 1000 | | x | h | X | H | 8 | ( | CONTROL X | CONTROL H |
| 7 | 0111 | | w | g | W | G | 7 | ' | CONTROL W | CONTROL G |
| 6 | 0110 | | v | f | V | F | 6 | & | CONTROL V | CONTROL F |
| 5 | 0101 | | u | e | U | E | 5 | % | CONTROL U | CONTROL E |
| 4 | 0100 | | t | d | T | D | 4 | $ | CONTROL T | CONTROL D |
| 3 | 0011 | | s | c | S | C | 3 | # | CONTROL S | CONTROL C |
| 2 | 0010 | | r | b | R | B | 2 | " | CONTROL R | CONTROL B |
| 1 | 0001 | | q | a | Q | A | 1 | ! | CONTROL Q | CONTROL A |
| 0 | 0000 | | p | ` | P | @ | 0 | SPACE BAR | CONTROL P | CONTROL @ |
| | CHAR / POS | | 111 | 110 | 101 | 100 | 011 | 010 | 001 | 000 |

TABLE OF KEYBOARD FUNCTIONS

SIMPLE MULTIPLEXER

COMPLEX MULTIPLEXER

POSITION

CHARACTER

| | 9 | 8 | 7 | 6 | 5 | 4 | 3 | 2 | 1 | 0 |
|---|---|---|---|---|---|---|---|---|---|---|
| 9 | 1001 | | 121 | 105 | 89 | 73 | 57 | 41 | 25 | 9 |
| 8 | 1000 | | 120 | 104 | 88 | 72 | 56 | 40 | 24 | 8 |
| 7 | 0111 | | 119 | 103 | 87 | 71 | 55 | 39 | 23 | 7 |
| 6 | 0110 | | 118 | 102 | 86 | 70 | 54 | 38 | 22 | 6 |
| 5 | 0101 | | 117 | 101 | 85 | 69 | 53 | 37 | 21 | 5 |
| 4 | 0100 | | 116 | 100 | 84 | 68 | 52 | 36 | 20 | 4 |
| 3 | 0011 | | 115 | 99 | 83 | 67 | 51 | 35 | 19 | 3 |
| 2 | 0010 | | 114 | 98 | 82 | 66 | 50 | 34 | 18 | 2 |
| 1 | 0001 | | 113 | 97 | 81 | 65 | 49 | 33 | 17 | 1 |
| 0 | 0000 | | 112 | 96 | 80 | 64 | 48 | 32 | 16 | 0 |
| CHAR / POS | | | 111 | 110 | 101 | 100 | 011 | 010 | 001 | 000 |

TABLE OF CHR$ FUNCTION (DEC)

FIG. 6

POSITION COLUMN

CHARACTER

| | 9 | 8 | 7 | 6 | 5 | 4 | 3 | 2 | 1 | 0 |
|---|---|---|---|---|---|---|---|---|---|---|
| 9 | 1001 | | | | | | | | B | D |
| 8 | 1000 | | | | | | | | O | CR |
| 7 | 0111 | | | | | | | | Q | U |
| 6 | 0110 | | | | | | | | P | I |
| 5 | 0101 | | | | | | | | Y | S |
| 4 | 0100 | | | | | | | | H | SPACE BAR |
| 3 | 0011 | | | | | | | | W | A |
| 2 | 0010 | | | | | | | | L | LF |
| 1 | 0001 | | | | | | | | Z | E |
| 0 | 0000 | | | | | | | | T | BLANK |
| | | | 111 | 110 | 101 | 100 | 011 | 010 | 001 | 000 |

TELEX TABLE

FIG. 7

DIGITAL DISPLAY DEVICES WITH REMOTE UPDATING

BACKGROUND OF THE INVENTION

Because of the inherent inaccuracy in conventional digital timepieces, the displayed time varies from the reference time at the National Bureau of Standards. Present digital clocks and watches contain expensive crystals and other time measuring devices which will maintain the displayed time to within one second of the standard reference time for a period of hours or days. The problem with conventional digital timepieces is that they require periodical resetting. Present methods of resetting are time consuming and inaccurate. Furthermore, each digital timepiece requires individual consideration because of the varied inaccuracies associated with different digital timepieces.

A further problem in commercial time display. In office buildings and factories a power outage requires resetting many clocks and timeclocks. A shift from or to daylight saving time requires resetting all of the timepieces.

Present digital clocks rely upon a counting scheme to drive a digital display indicative of time and the passage of time. These units are disigned for manual resetting, but electronic resetting is cumbersome and expensive, requiring sophisticated interfaces and/or producing an undesirable effect on the display. Furthermore, present digital timepieces lack the capacity for remote updating. Additionally, present digital timepieces are not suitable for multiple simultaneous updating. A further problem is correction of initial inaccurate settings.

OBJECTIVES OF THE INVENTION

It is therefore an objective of this invention to provide an improved digital display that is remotely resettable and updateable.

It is a further objective of the invention to provide a master digital display for simultaneously updating multiple digital displays.

Another objective of the invention is an improved digital timepiece.

Another objective of the invention is a digital timepiece referenced to the standard time at the National Bureau of Standards.

A further objective of the invention is a master digital timepiece for simultaneously updating multiple digital timepieces.

Another further objective of the invention is a digital timepiece for incorporation in a standard telephone which timepiece is updated by the telephone line signal.

A still further objective of the invention is a method for remote update of digital displays and digital timepieces.

Other features, objectives, advantages and applications of the invention will be set forth in or become more apparent from the following detailed description of the preferred embodiments described hereinafter when read with the accompanying drawings.

BRIEF DESCRIPTION OF THE INVENTION

Digital displays are remotely updated by either TTL Logic or microprocessor means. A single digital display device according to the present invention can be used as a control master for simultaneous updating of multiple digital displays. Digital timepieces can be contiunually referenced to the reference time at the National Bureau of Standards.

BRIEF DESCRIPTION OF THE DRAWINGS

FIG. 6 is a chart of the CHR$ Function (DEC) matrix for a multiplexer.

FIG. 7 is a chart of a Telex matrix for a multiplexer.

DETAILED DESCRIPTION OF THE INVENTION

Figure 1:
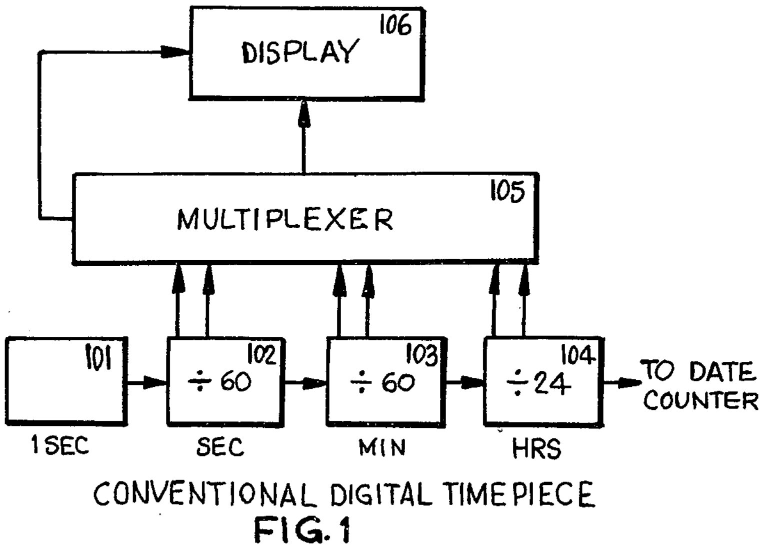
FIG. 1 discloses a block diagram of a conventional digital timepiece.

As set forth above, one of the important objectives of the invention is an improved digital timepiece. A conventional digital timepiece is depicted in FIG. 1. An oscillator 101 generates a one second signal which is successively subdivided by divider chains 102, 103, 104, to produce minutes and hours and can be further divided to produce the change in date. The multiplexer 105 cycles at a high enough rate that the digital display 106 appears to be continuous to the human eye. The digital display can be used for various combinations of the date and time.

Setting of the conventional digital timepiece is achieved by gating the one second clock into the appropriate minute, hour or date counter. When the desired setting is attained, the manual control is released. This method of manual setting is awkward, time consuming and inaccurate. Furthermore, each timepiece must be individually set.

The improved digital timepieces according to the invention can be set for time and any other desired functions in less than one second by introducing an electronic signal. The conventional digital timepiece is unsuited to this because the counters would have to be reset and run up to a prescribed number of pulses. The conventional modules do not have this reset available and the circuitry and signals to perform this gated pulse entry are complex. An incorrect or blank display might also be present during the resetting interval.

Figure 2:
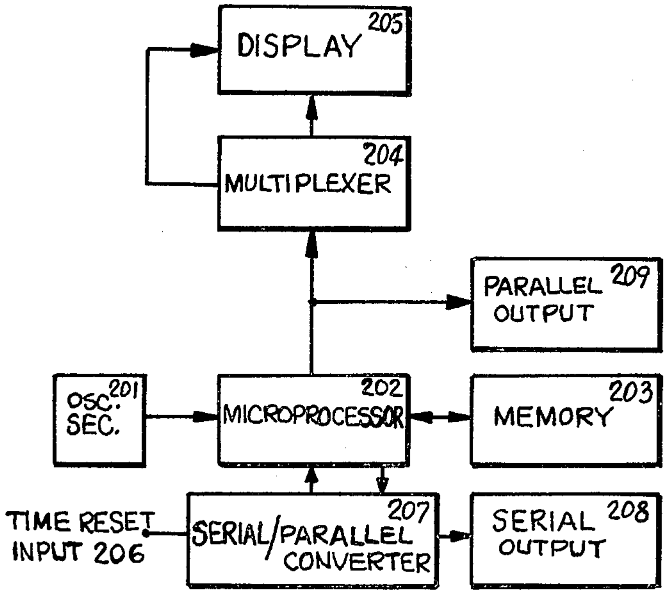
FIG. 2 is a block diagram illustrating an embodiment of the invention for remote updating of the digital time display with a microprocessor and for simultaneous updating of multiple digital displays.

An improved digital timepiece according to the invention is depicted in FIG. 2. Oscillator 201 interrupts the microprocessor 202 causing it to update the memory 203 in accordance with the normal time algorithm for seconds, minutes, hours and date. After performing this memory update, the microprocessor goes back to operating the multiplexer 204 and display 205 from memory until the next second update tick. If an external time reset input 206 comes into the serial to parallel converter 207, the microprocessor changes the data in the specified location and returns to its function of updating the display from memory. If the digital timepiece is to be utilized as a master, data can be transferred in the serial output mode 208 or the parallel output mode 209. Thus one improved digital timepiece according to the invention can be used for simultaneous update of multiple digital displays. The serial-parallel converter can be a CATCODE decoder as described in application Ser.

No. 474,792, filed May 30, 1974, or a more conventional UART. It will be understood that numerous serial-parallel converters can be utilized without departing from the scope of the invention. The serial input can be derived from numerous electronic systems such as reciever means, cable means and the like. A number of programs and priority sets can be utilized to achieve the aforesaid results without departing from the scope or intention of the invention.

In one of the preferred embodiments, the digital clock uses the microprocessor to drive the time display. If the external time reset input selected is a standard teletype or EIA signal at 110 BAUD, then one second would be sufficient to reset the digital clock. This signal could be transmitted, for example, once per hour/day/-week over standard telephone or teletype line to provide updating for the clock. The updating signal for the clock can be obtained from other common carriers such as paging companies, CB radios, satellites, in-plant master clocks or other timepieces according to the invention. If it is desired to use a satellite to transmit the updating signal, a time advance of 0.3 seconds is utilized to compensate for the distances that the signal must travel along the route between the sending and receiving points. The time advance can be varied to compensate for the distance that the signal must travel and the needed degree of precision in the transmitted time.

In another embodiment of the invention the updating signal is utilized to control the digital display without the microprocessor. If a continuous 1200 BAUD line is available, then a simple multiplexer display driven by a serial-parallel converter such as a UART will provide a suitable display. If a continuous 110 BAUD or 300 BAUD line is available, then a digital display with buffering for each digit and a serialparallel display will provide a suitable digital display. If only four digits, i.e., hours and seconds are desired, then the digital display with buffering can be updated as infrequently as once per minute.

The digital timepieces according to the invention can be incorporated into the a standard telephone to display the correct time while updating signal is transmitted over the telephone line to the phone.

Figures 3, 5:
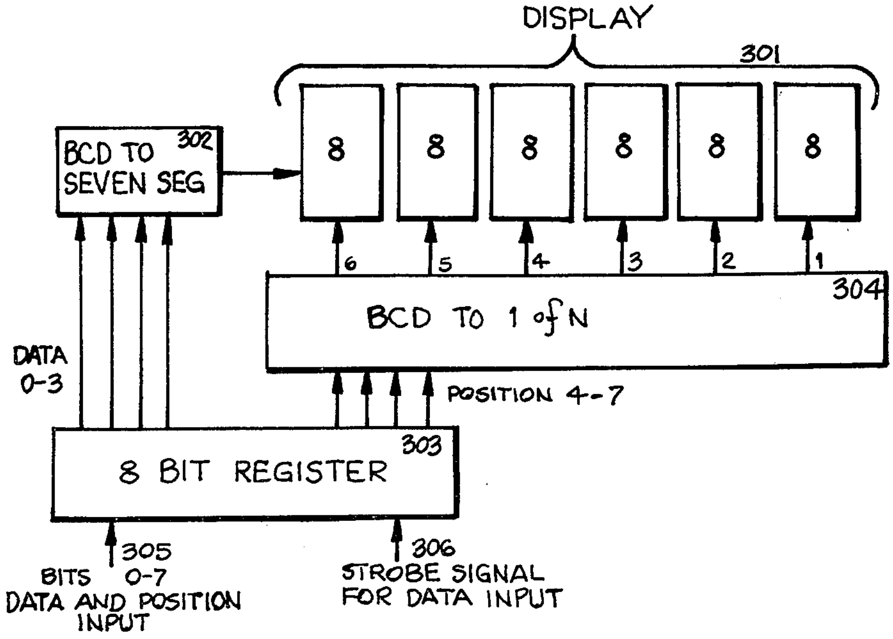
FIG. 3 is a schematic circuit diagram of a simple multiplexer.
FIG. 5 is a chart of the ASCII matrix for a multiplexer.

Furthermore, the coding system for the time reset input could take several forms. However, it is a further objective of the invention to generate a coding format such that a simple multiplexer as shown in FIG. 3 will display the correct time if driven from a time reset input signal through a serial-parallel converter without the use of a microprocessor. Referring to FIG. 3, the multiplexer display 301 shows the single character decoded by BCD-SEVEN SEGMENT DECODER 302 from 8 bit data register 303, bits 0–3, in the position decoded by BCD to 1 of N 304, from 8 bit data register 303, bits 4–7. Data bits 0–7 are entered into 8 bit data register 303 by data and position input 305 after which strobe signal 306 is applied causing the transfer of data.

The choice of position and data bits allows easy use of conventional ASCII or Teletype coding for the time reset input signal. Thus if it is desired to send information to the microprocessor/clock saying "set the date as follows" this information would be ignored by the simple multiplexer if a position greater than 6 or less than 1 was specified.

The multiplexer of FIG. 3 will appear to be continuously displaying four digits of time, i.e., hours and minutes, if the time reset input signal cycles at 120 HZ or approximately 1200 BAUD. For apparently continuous display with six digits, the time reset input signal may recycle at 180 HZ or 1800 to 2400 BAUD.

Figure 4:
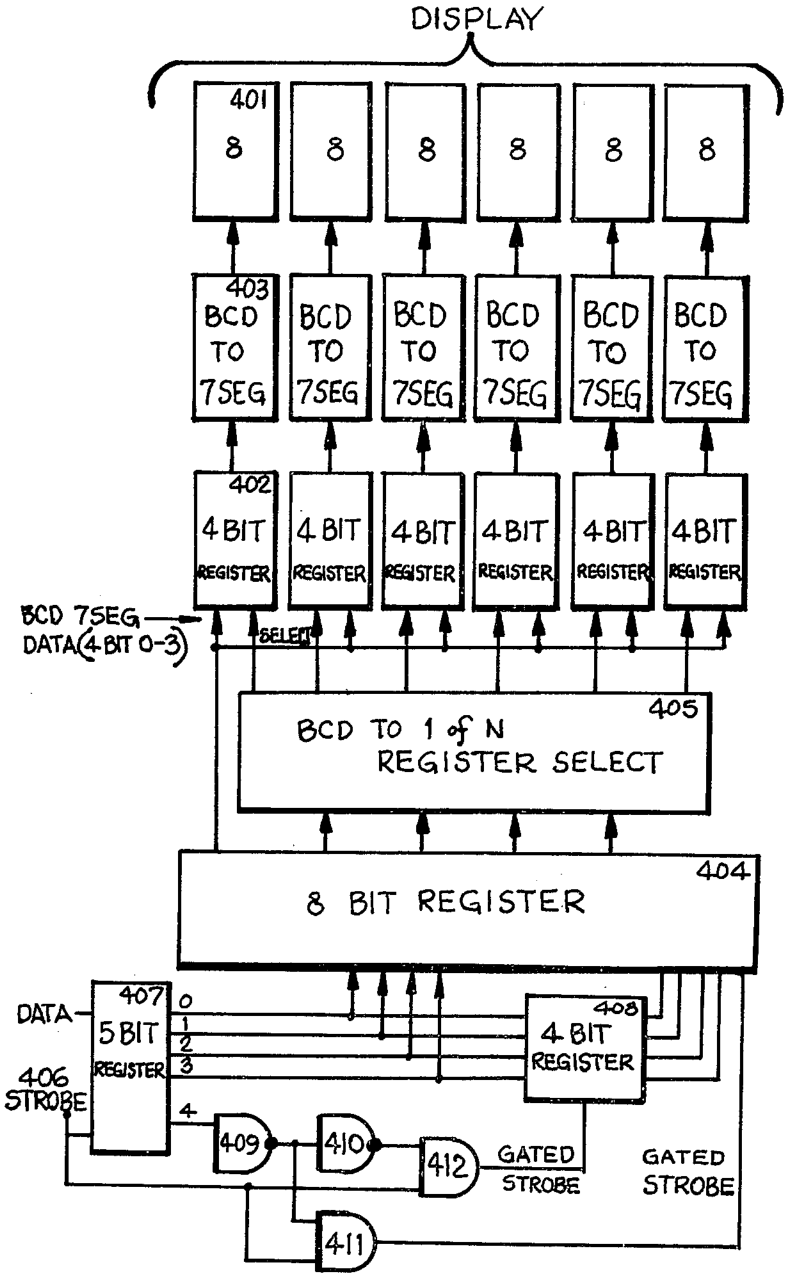
FIG. 4 is a schematic circuit diagram of a complex multiplexer.

Referring to FIG. 4 which shows a more complex multiplexer wherein each digit displayed 401 has its own 4 bit memory 402 and BCD -SEVEN SEGMENT DECODER 403. The 8 bit register 404 provides the data bits 0–3 to all the 402 inputs, while BCD to 1 of N 405 provides the select information from 404, bits 4–7. The select information steers the strobe 406 into the appropriate 402 register. Thus the time reset input signal need only be supplied once per second if seconds are being displayed or once per minute if minutes and hours only are being displayed.

FIG. 4 also illustrates input registers 407, 408, inverters 409, 410 and AND gates 411, 412. For this system time data can be inserted with a Telex signal that is a five level code. In the scheme shown the fifth bit presence causes the data presented to register 407 to be strobed into register 408 but not 404, the 8 bit register. The same arrangement of elements 407–412 can be used to precede the simple multiplexer of FIG. 3, thus allowing it to operate from Telex type five level signals. The microprocessor program can be altered so that a hardware change would not be necessary except possibly in the serial-parallel converter to operate from Telex signals.

It will be obvious to those skilled in the art that the various combinations of the functions described in FIGS. 2,3 and 4 can be modified such as implementation on a single chip or expansion of the memory of the microprocessor without departing from the scope or intention of the invention.

Input schemes compatible with both microprocessor and simple multiplexer digital display devices are depicted in FIGS. 5, 6 and 7. These tables are a guide for selection of appropriate codes for input reset data and constitute another important objective of the invention.

The matrix table in FIG. 5 shows ASCII values of position and characters with the ASCII symbols. FIG. 6 shows decimal CHR$ values of the Digital Equipment Company that are used internally for computation of the ASCII values. The microprocessor's program can store the table in FIG. 5 and use a two key lookup to generate the proper ASCII output for position and character. For example, if the positions 6, 5, 4, 3 were being used for the timepiece display and the time was 9:15, the microprocessor output would be YA5. Instead of storing the table, ASCII values can be computed by the CHR$ function (DEC). In this case, the microprocessor would add 80 to 9 and compute CHR$ (89). Then the microprocessor would add 64 to 1 and compute CHR$ (65). Then the microprocessor would add 48 to 5 and compute CHR$ (53). Likewise, the output would be YA5 and the simple multiplexer woud display 9:15. The table lookup or calculation of CHR$ (N) is a direct fast way to display the desired time/date. Unfortunately, the control functions are sometimes used to do other things in communication links, and some links do not support all of the letters of the alphabet. In those cases, a simpler and more flexible set may be used. If the two stage circuit of FIG. 4, 407–412 is used and the most significant position bit is used for selection of position then a subset of upper case letters and the numbers 0-9 can be used to transmit the time information. In this case the transmission of 9:15 to digits 6, 5, 4, 3 would be E9D1C5 or U9T1C5. Any other column position set 0–3 could be selected for the number and any other column position set 4–7 could be used for the position.

In the case of the Telex code matrix of FIG. 7, a two step circuit such as elements 407–412 is clearly needed. Further, the right most table entry column should be used as position with the leading digit inverted. Thus, the transmission of 9:15 to the digits 6, 5, 4, 3 would be SB space ZAY. The two step method requires twice as long, but does permit the use of a much smaller transmission set and the easy inclusion of date/time instructions. While the transmission of data has been illustrated with time/date input it will be readily apparent that most other data can be used with the digital display method of the invention such as transmission of telephone numbers with up to 10 digits. Further, a four bit microprocessor can be used if the AND/OR of bits 4,3; 4,2 are used to select position. In this case up to 6 positions (2–7) can be used.

Variable programs can be used with the microprocessor. A time algorithm for can be chosen, for example,

```
BEGIN S=S+1
  IF S>=60 THEN S=0 AND M=M+1
  IF M>=60 THEN M=0 AND H=H+1
  IF H>=24 THEN H=0
  PRINT H, M, S AND WAIT T CYCLES
  GO TO BEGIN
```

If the microprocessor is very fast, i.e., T cycles/second is large, then it is possible to use a less accurate crystal or timing means other than crystals, if frequent updating is used. The digital display method of the invention can be used for other applications such as stock market activity and communications.

While the invention has been particularly shown and described with reference to preferred embodiments thereof, it will be understood by those skilled in the art that the foregoing and other changes in the form and details may be made therein without departing from the spirit and scope of the invention.

I claim:

1. In a digital display device having a display multiplexer and microprocessor means for controlling and updating the display, the improvement comprising: oscillator means and memory means whereby said oscillator means periodically interrupts the microprocessor means to update data stored in the said memory means and thereafter said microprocessor means operates the display multiplexer from said data in said memory means until further interruption from said oscillator means.

2. In the digital display device of claim 1, the further improvement comprising: external data input means for updating the data stored in said memory means.

3. In the digital display device of claim 2, the further improvement comprising: output means for transfer of display data to another digital display device.

4. In the digital display device of claim 2, said external data input means comprises a universal asynchronous receiver transmitter.

5. In the digital display device of claim 1, said digital display device comprises a timepiece.

6. In the digital display device of claim 1, said digital display device comprises a telephone.

7. In the digital display device of claim 2, said digital display device comprises a timepiece.

8. In the digital display device of claim 3, said digital display device comprises a timepiece.

* * * * *